(12) United States Patent
Dablain et al.

(10) Patent No.: US 6,587,791 B2
(45) Date of Patent: Jul. 1, 2003

(54) SYSTEM AND METHOD FOR ASSIGNING EXPLORATION RISK TO SEISMIC ATTRIBUTES

(75) Inventors: Mark A. Dablain, Plano, TX (US); Mark E. Bengtson, Flower Mound, TX (US); David L. Strickler, Arlington, TX (US); David E. Sanders, Highland Village, TX (US); Brett Edwards, Evergreen, CO (US)

(73) Assignee: Pioneer Natural Resources USA, Inc., Irving, TX (US)

( * ) Notice: Subject to any disclaimer, the term of this patent is extended or adjusted under 35 U.S.C. 154(b) by 0 days.

(21) Appl. No.: 09/974,997

(22) Filed: Oct. 11, 2001

(65) Prior Publication Data

US 2003/0074138 A1 Apr. 17, 2003

(51) Int. Cl.$^7$ .................................................. G01V 1/28
(52) U.S. Cl. ........................................................ 702/16
(58) Field of Search ................................ 702/11, 12, 13, 702/14, 6; 367/73

(56) References Cited

U.S. PATENT DOCUMENTS 6,182,014 B1 * 1/2001 Kenyon et al. ................ 702/14
6,381,543 B1 * 4/2002 Guerillot et al. .............. 702/13

* cited by examiner

Primary Examiner—Donald E. McElheny, Jr.
(74) Attorney, Agent, or Firm—Hughes & Luce LLP (57) ABSTRACT

An improved method for assessing the geologic risk for hydrocarbon presence and hydrocarbon accumulation size is disclosed. In one configuration, seismic attributes are assigned to a horizontal axis and data quality to a vertical axis to form a matrix crossplot. Direct Hydrocarbon Indicators (DHI) derived from seismic data are used to qualify the presence and accumulation size. A quantitative method for scaling and calibrating the DHI matrix is illustrated that can be applied to existing petroleum basins and by analog to frontier areas.

20 Claims, 12 Drawing Sheets

| ATTRIBUTE CHARACTERISTICS | | DATA CONFIDENCE | |
|---|---|---|---|
| CONFORMANCE | Partial Fit to Depth Structure ▽ | COVERAGE | 3D Partial Coverage ▽ |
| FLAT SPOT | Evident in some orientations ▽ | SEISMIC QUALITY | Low to moderate S/N(A/B problematic) ▽ |
| A/B | Top of base amplitude evident but < model expectation ▽ | WELL CONTROL | Well located in analog minibasin in basin ▽ |
| | | ANALOGS | Analog from same survey ▽ |
| AVO Class 3 | Top and base gradient incr (-/+) and general model agreement ▽ | SEISMIC DATA TYPE | Post Stack Time ▽ |
| SAG | No Velocity Sag Visible ▽ | DEPTH CONVERSION | Not done - Time Map ▽ |
| ATTENUATION | None Visible ▽ | SYNTHETICS | Not Done ▽ |
| | ▽ | AVO COVERAGE | No Pre-Stack Migrated Data ▽ |
| | | PHASE | Not Done ▽ |
| | | TUNING | Event AT or BELOW Tuning ▽ |
| | | INVERSION | Not Done ▽ |

| Geologic Chance of Occurrence: | Ratings (0-1) | |
|---|---|---|
| TRAP GEOMETRY FACTORS | | |
| *PRESENCE* | 0.60 | |
| *MAP RELIABILITY & CONTROL* | | |
| KEY FACTOR | | 0.60 |
| RESERVOIR FACTORS | | |
| *PRESENCE* | 0.70 | |
| *PERMEABILITY* | | |
| *POROSITY* | | |
| KEY FACTOR | | 0.70 |
| SEAL FACTORS | | |
| *TOP SEAL* | 0.90 | |
| *LATERAL SEAL* | | Dependent |
| *BASE SEAL* | | |
| KEY FACTOR | | 0.90 |
| SOURCE FACTORS | | |
| *QUANTITY / VOLUME* | 0.70 | |
| *QUALITY / RICHNESS* | | |
| *MATURATION* | | |
| KEY FACTOR | | 0.70 |
| TIMING FACTORS | | |
| *TIMING OF CLOSURE / TRAP* | 0.80 | |
| *TIMING OF EXPULSION* | | |
| *EFFECTIVE MIGRATION FAIRWAY* | | Dependent |
| *PRESERVATION* | | Dependent |
| KEY FACTOR | | 0.80 |
| Geologic Chance (Pg): | 0.21 | |

ATTRIBUTE CHARACTERISTICS

| | |
|---|---|
| CONFORMANCE | Partial Fit to Depth Structure ▷ |
| FLAT SPOT | Evident in some orientations ▷ |
| A/B | Top of base amplitude evident but < model expectation ▷ |
| AVO Class 3 | Top and base gradient incr (-/+) and general model agreement ▷ |
| SAG | No Velocity Sag Visible ▷ |
| ATTENUATION | None Visible ▷ |

DATA CONFIDENCE

| | |
|---|---|
| COVERAGE | 3D Partial Coverage ▷ |
| SEISMIC QUALITY | Low to moderate S/N (A/B problematic) ▷ |
| WELL CONTROL | Well located in analog minibasin in basin ▷ |
| ANALOGS | Analog from same survey ▷ |
| SEISMIC DATA TYPE | Post Stack Time ▷ |
| DEPTH CONVERSION | Not done - Time Map ▷ |
| SYNTHETICS | Not Done ▷ |
| AVO COVERAGE | No Pre-Stack Migrated Data ▷ |
| PHASE | Not Done ▷ |
| TUNING | Event AT or BELOW Tuning ▷ |
| INVERSION | Not Done ▷ |

*FIG. 11*

Conformance

No fit to depth structure  
No depth conversion but fit to time structure  
Partial fit to depth structure } qualifiers  
Good fit but with some stratigraphic variation  
Excellent fit to depth structure Seismic Quality Low to moderate Signal-to-Noise (A/B problematic)  
Low to moderate resolution relative to bed thickness } qualifiers  
High resolution relative to bed thickness  
High resolution relative to bed thickness and long offsets

FIG. 12

| Seismic Quality | Maximum Score Factors |
|---|---|
| Conformance | .40 |
| Flat Spot | .23 |
| A/B | .20 |
| AVO Class 3 | .09 |
| SAG | .05 |
| Attenuation | .03 |
| | Total = 1.00 |

SYSTEM AND METHOD FOR ASSIGNING EXPLORATION RISK TO SEISMIC ATTRIBUTES

BACKGROUND

1. Field of the Invention

The invention relates to risk analysis in oil and gas prospecting. More particularly, it relates to the use of seismic attributes and supporting data quality to reduce the uncertainty of hydrocarbon presence and the uncertainty of accumulation size.

2. Description of the Prior Art

Oil and Gas exploration is typically a high-risk enterprise. Several geologic factors are needed to insure a petroleum accumulation. Prior to drilling, there are usually incomplete information and a variable quality of information regarding the necessary geologic factors. One important tool for pre-drill risk mitigation is seismic data.

For many years seismic exploration for oil and gas has involved the use of seismic energy sources and seismic receivers. The seismic receivers, the land based versions commonly called geophones and aquatic based versions called hydrophones, sense acoustic waves and produce electric signals indicative of the sensed waves.

In typical exploration practice, a source energy is generated by a seismic energy source, and when sensed, are transformed into electrical signals. The source wave travels into the surface of the earth and is reflected or refracted by subsurface geologic features. These reflections are detected by the phones and are converted to electric signals. These electric signals represent acoustic waves reflected from the interface between subsurface layers in the earth and form a continuous amplitude signal in time. The amplitude recording in time of the phone output at a single location is commonly called a seismic trace.

It is common practice for an arrangement of sources and receivers to be repeated in a predictable pattern, which then allows many seismic traces to be recorded. A collection of seismic traces, gathered in a repeatable way, forms a complete seismic survey. The source and receiver pattern within a seismic survey is generally repeated along a line, called two-dimensional data (2-D) or in some rectangular fashion covering an area, called three-dimensional data (3-D).

Modern seismic recording equipment transforms the analog signals produced by the phones to digital representations of the signal. These seismic traces are stored on a medium, such as magnetic tape, as digital samples. The digitized traces containing the reflection amplitudes from the earth can then be rearranged and processed by computer software to form a representative image of the earth's subsurface layers.

One such technique in seismic processing is to form CMP (Common Mid-Point) gathers of seismic traces. The CMP technique groups together seismic traces with the same mid-point between the source and receiver. The traces within the CMP gather are further sorted by increasing distance between source and receiver. This distance between source and receiver is usually referred to as source-receiver offset.

Figure 1:
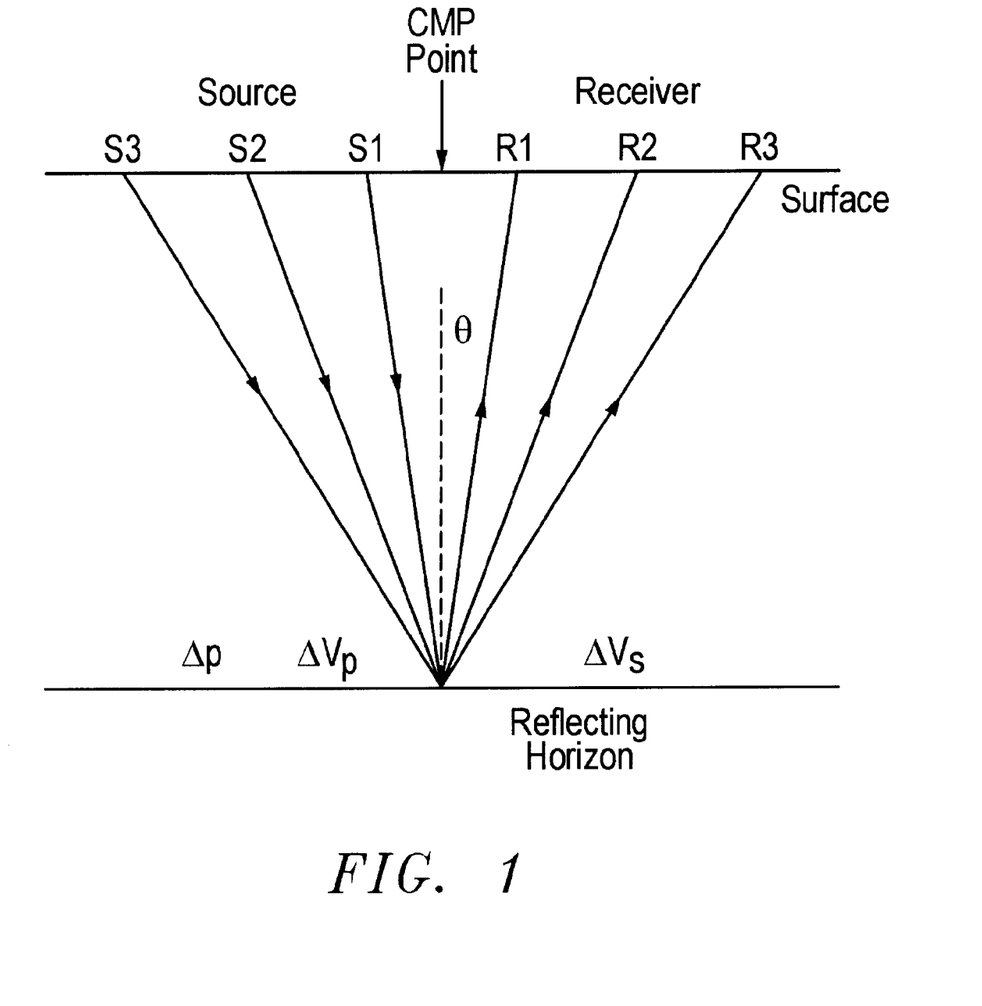
FIG. 1 illustrates the reflected seismic energy from a subsurface interface gathered about a CMP point.

FIG. 1 is a ray diagram detailing the CMP technique. For the case of a flat earth approximation, the CMP gather represents reflection signal from a common point on the interface between subsurface layers. FIG. 1 illustrates the seismic energy reflected from a subsurface interface for source-receiver offset pairs within a CMP gather. Note that in FIG. 1 all of the reflected energy corresponds to the same subsurface point but for differing source-receiver offsets.

Figure 2:
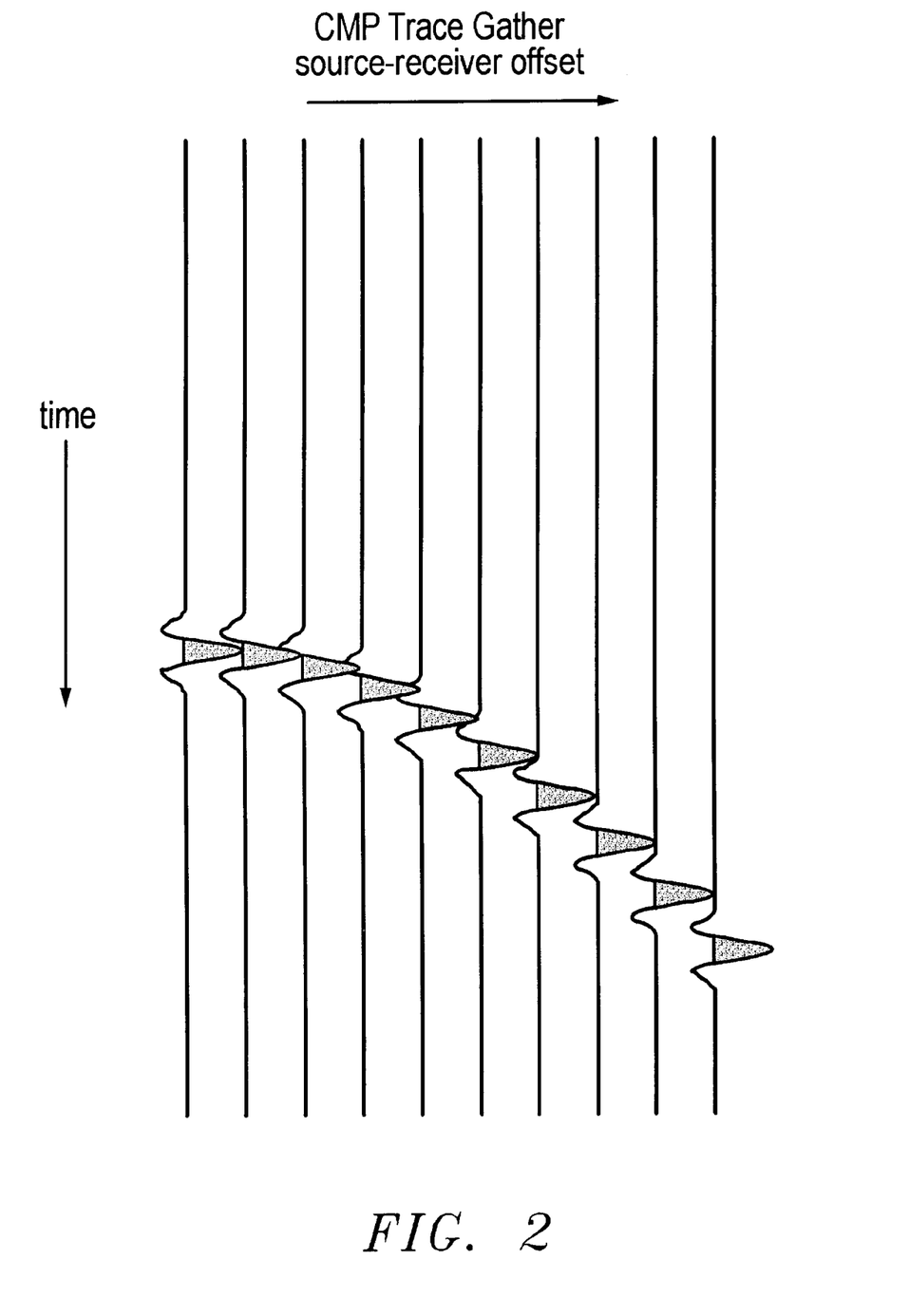
FIG. 2 the reflected amplitude energy on seismic traces within a CMP gather from a single subsurface point.

FIG. 2 is an exemplary trace showing the gathering of a single subsurface point in the context of a CMP gather. This figure illustrates a single subsurface point within a CMP gather represented by a series of amplitude traces in time with increasing offsets between the source and receiver.

Figure 3:
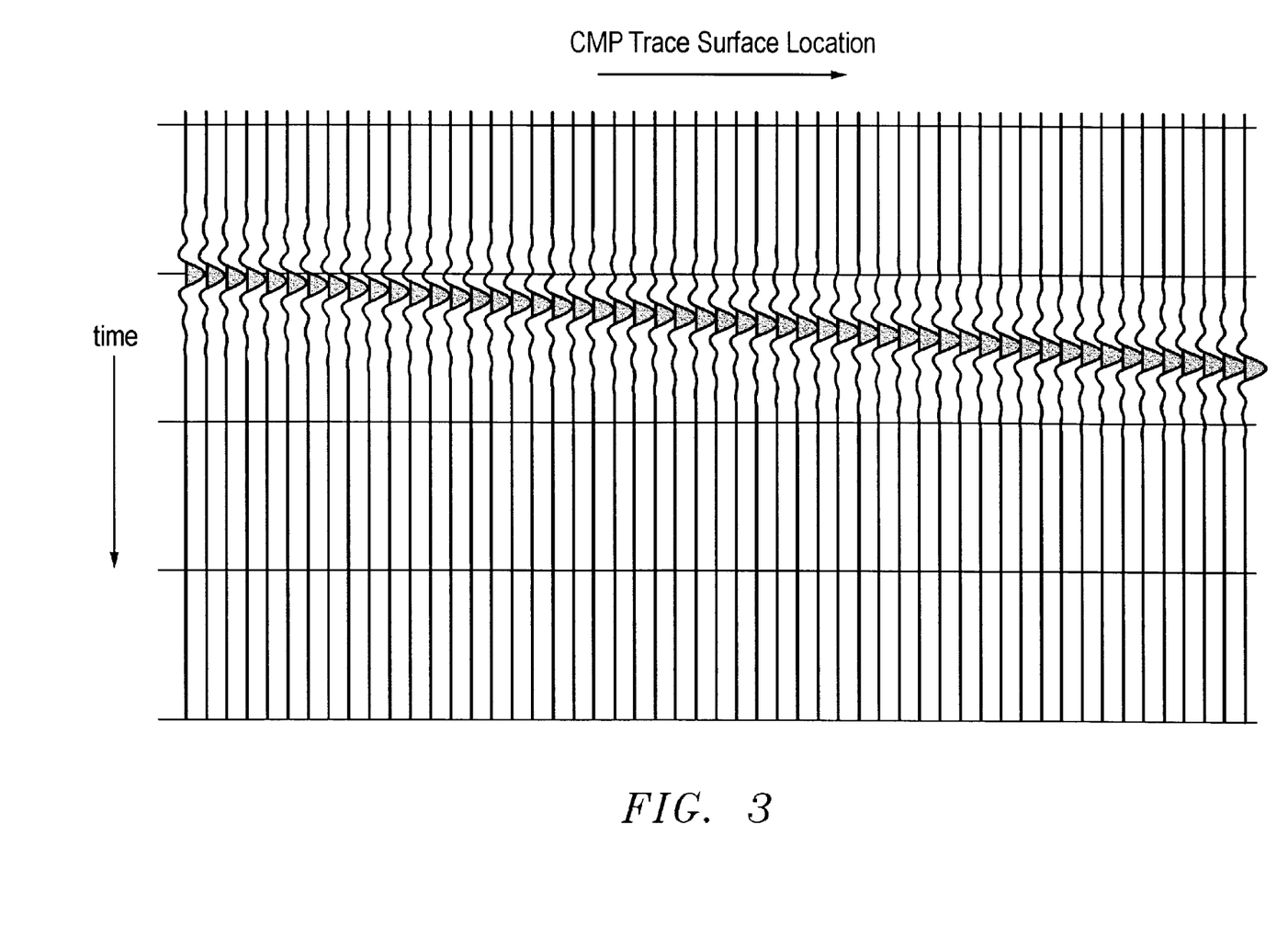
FIG. 3 an ordered line of CMP stacked traces imaging a single subsurface interface.

FIG. 3 is an exemplary embodiment of an equivalent time image of the subsurface reflection point or interface produced by ordering the traces in a line or over an area. To enhance signal from a single subsurface point, the reflection amplitudes within a CMP gather are flattened and then summed together (stacked) to eliminate noise or energy that does not correspond to the primary reflection. This process reduces each CMP gather to a single stacked trace. The amplitudes on the stacked trace represent different reflecting interfaces. Those skilled in the art can interpret this CMP stacked amplitude data as equivalent cross-sections of subsurface layers.

The primary use of CMP seismic data is to mitigate the pre-drill uncertainty in finding hydrocarbons. The following discussion, as summarized by FIGS. 4 through 8, outlines the basic elements of hydrocarbon risk analysis.

Figure 4:
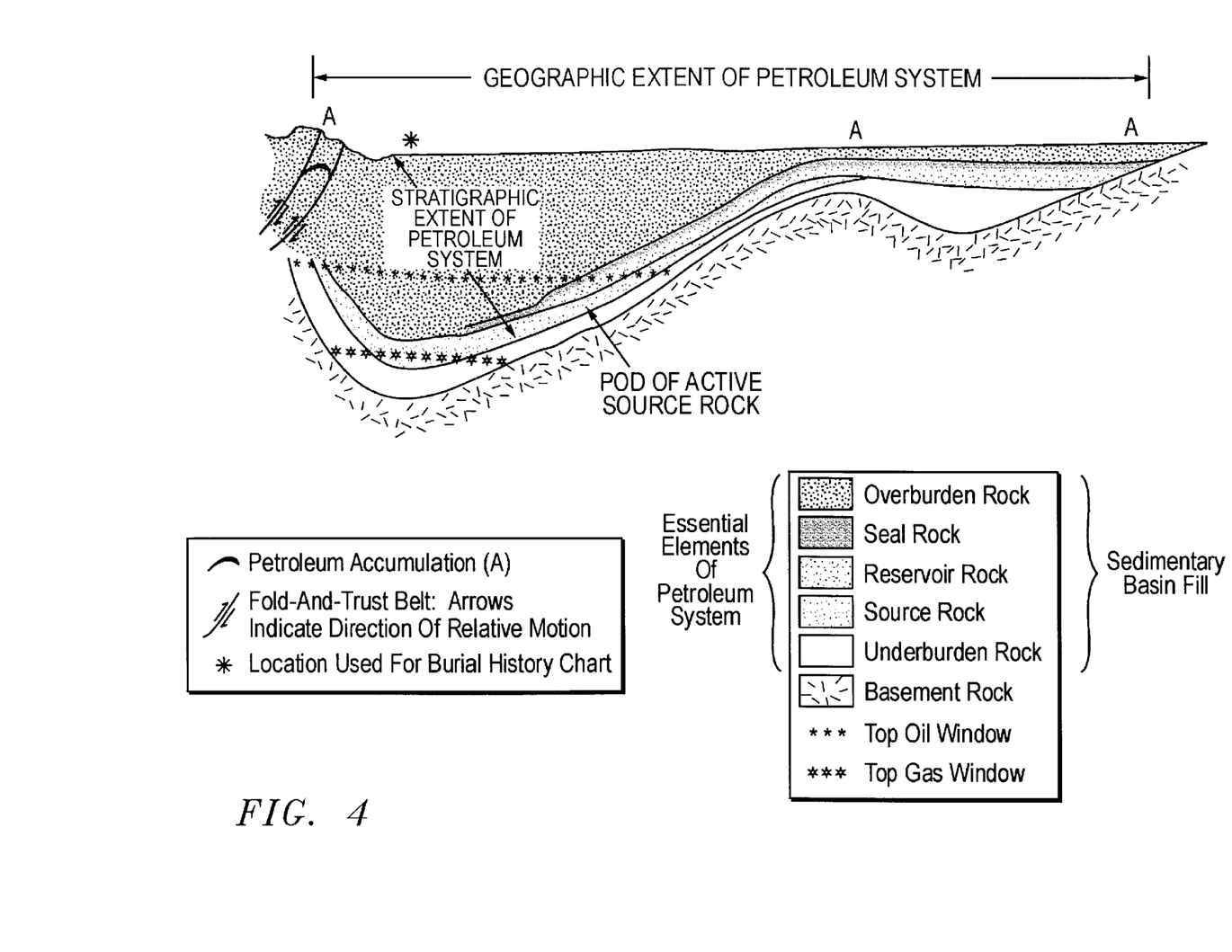
FIG. 4 illustrates the geologic elements necessary for the existence of a hydrocarbon accumulation.

FIG. 4 is a geologic diagram of conditions for hydrocarbon accumulation. As depicted in FIG. 4, several unlikely geologic conditions should be satisfied for a hydrocarbon accumulation to exist. These geologic elements are (1) trap, (2) reservoir, (3) source, (4) timing, and (5) seal. The most common use for CMP data is to contour subsurface layers and identify the likely area for a trap.

The quality and quantity of the CMP data introduces uncertainty in this estimate. Similar uncertainty exists for each of the geologic elements. This uncertainty is quantified by assigning a probability factor between zero to one (0.0–1.0) to each geologic factor.

Figure 5:
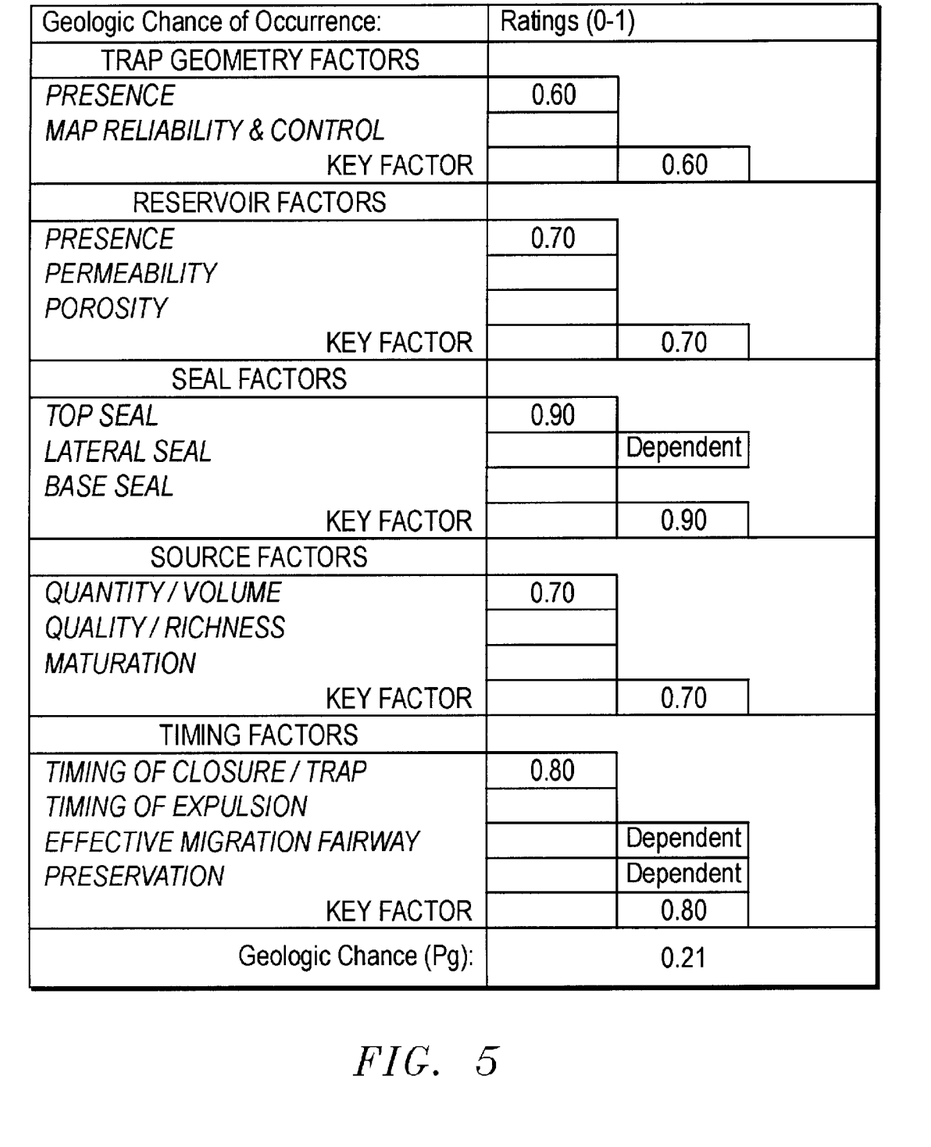
FIG. 5 an example of the product calculation for total geologic risk, Pg, based on five necessary geologic factors, each factor having its own probability for presence.

FIG. 5 is a probability diagram showing the determination of chance of petroleum accumulation. The product of these probability factors is usually designated Pg and indicates the chance that a petroleum accumulation exists. After all geologic elements have been investigated using the available data, the possible accumulation is referred to as a prospect.

Figure 6:
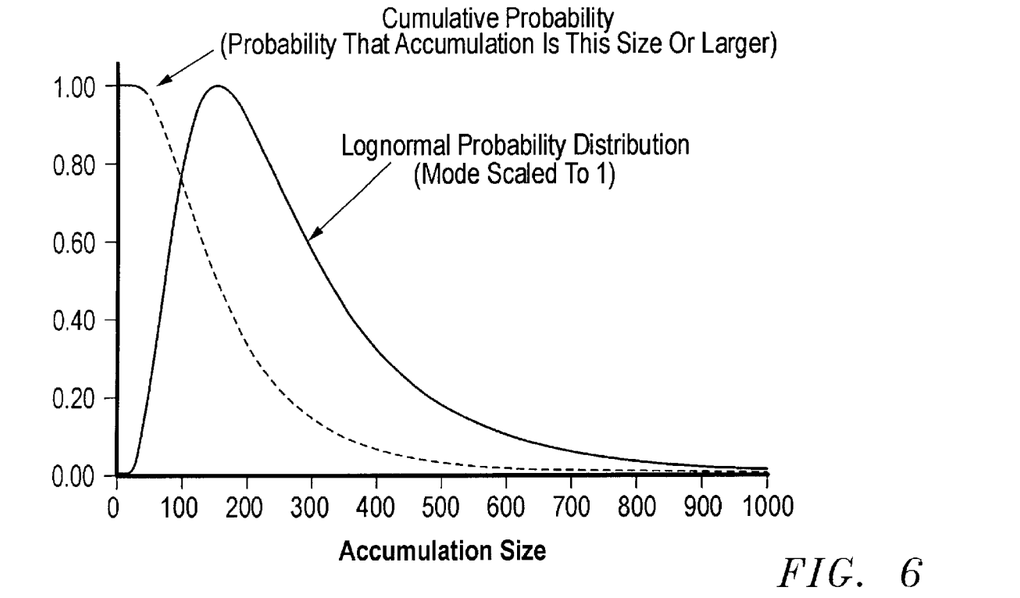
FIG. 6 shows a lognormal probability distribution and its equivalent cumulative probability distribution on a linear scale.

FIG. 6 is a probability distribution curve for accumulation size. Associated with the chance that an accumulation exists, is the probability distribution for accumulation size. The size distribution depends on specifics within the geologic area, however the shape of the distribution remains the same. To those skilled in the art, this shape is referred to as lognormal. The range of values in the lognormal distribution for size can be very large or very small.

Figure 7:
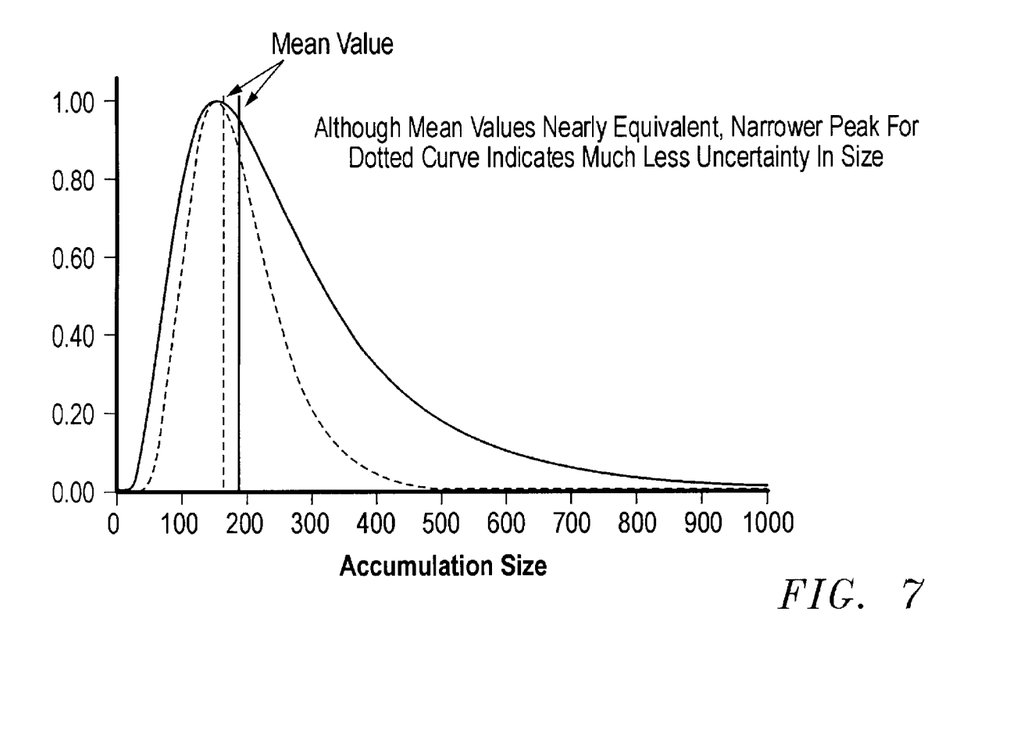
FIG. 7 illustrates that a narrower peak on the size distribution curve indicates more certainty in the possible size of the accumulation.

FIG. 7 is a probability distribution curve detailing the differences of the curves of FIG. 6. A small range in size distribution means that there is more certainty in the outcome, as illustrated in FIG. 7. The product of the probability distribution for size with the chance that an accumulation exists, Pg, determines the probability of finding a particular size of accumulation.

Figure 8:
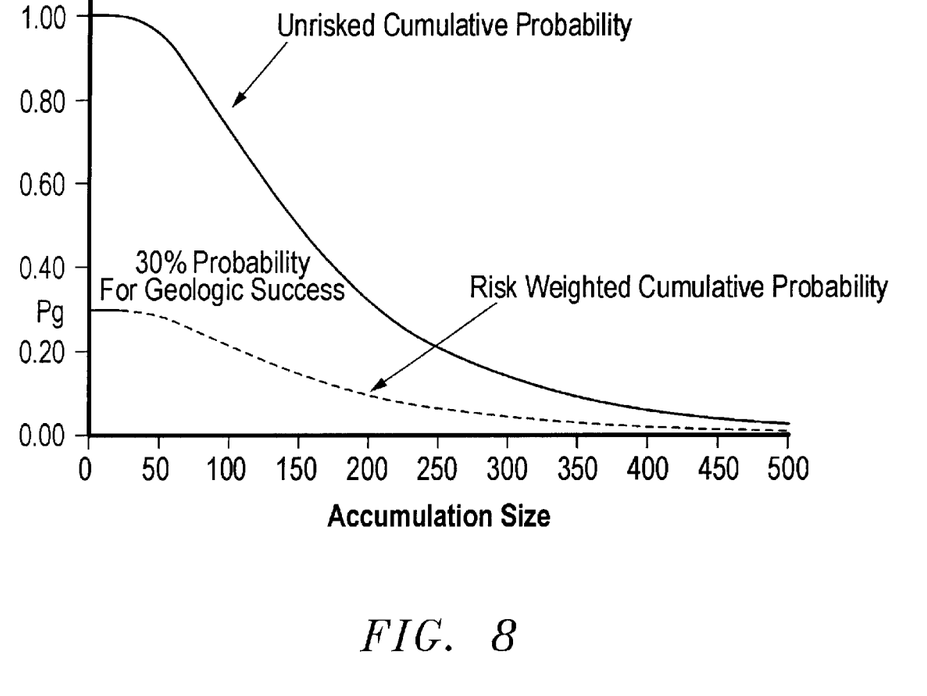
FIG. 8 an example of unrisked and risked weighted cumulative probability estimates for the size of hydrocarbon accumulations.

FIG. 8 is a distribution curve for a distribution estimate. This type of prospect risk analysis greatly aids a successful economic outcome of hydrocarbon exploration.

The use and interpretation of CMP data and its risk mitigation value continues to grow beyond simple mapping for trap. Seismic processing techniques are used to extract information from CMP amplitudes that more directly indicate the presence of hydrocarbons. These extracted attributes of CMP data are often called Direct Hydrocarbon Indicators or DHI's. One example of a DHI attribute is the amplitude variation with offset (AVO) within a CMP gather.

Figure 9:
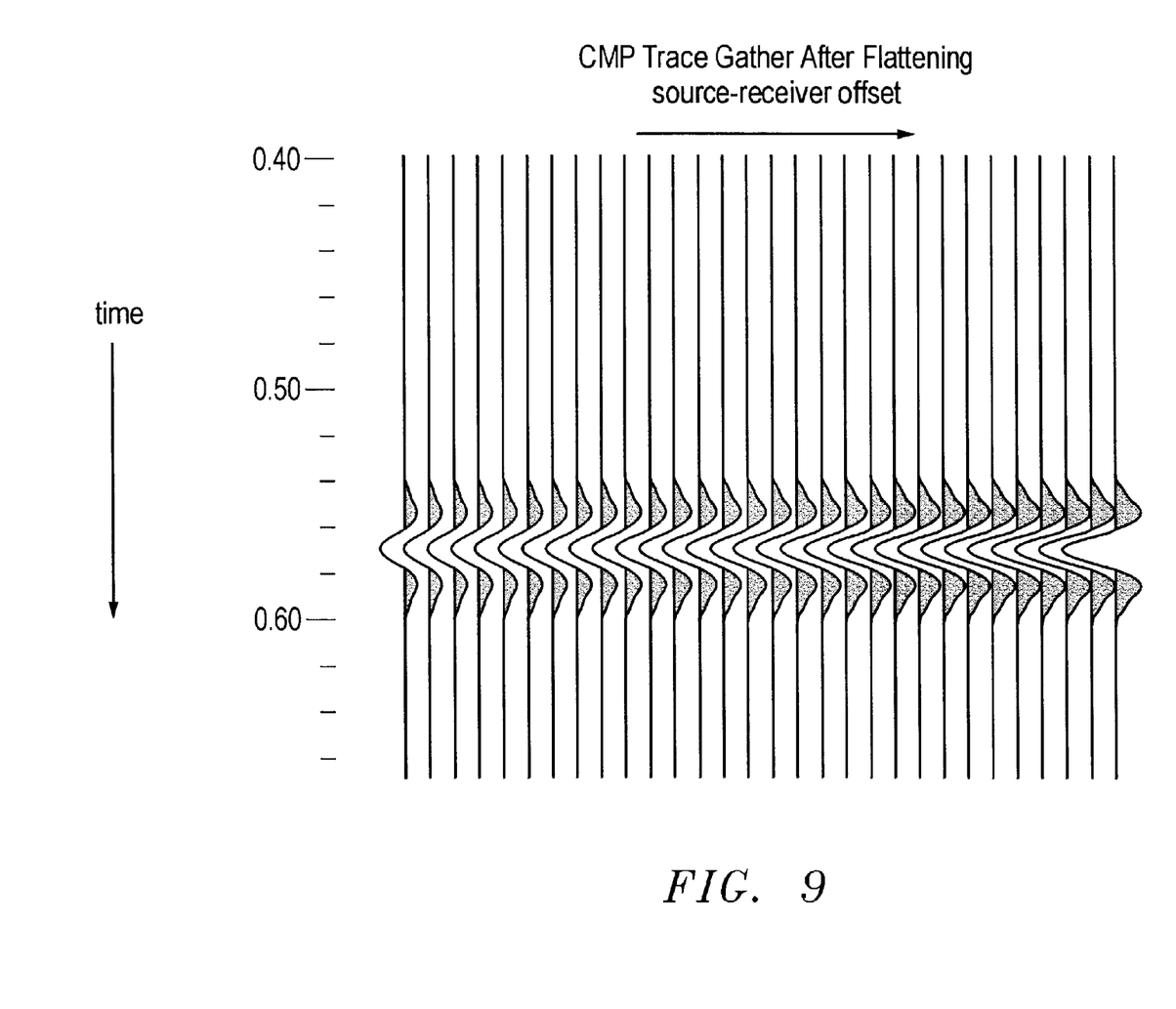
FIG. 9 a CMP gather showing an amplitude increase in the reflection event with increasing offset, indicating the possible presence of gas.

FIG. 9 is an exemplary AVO graph. Under specific conditions, these offset amplitude variations are indicative of a gas reservoir. As is the case with the geologic factors for hydrocarbon accumulation, there is ambiguity in the seismic attributes for DHI's.

Many typical analysis functions cannot empirically assess the risk and/or probability analysis in a cohesive integrated manner. As such, many intermediate steps have to be taken to achieve a subjective analysis of risk and/or probability factors, such as those discussed above, in the search for hydrocarbon bearing areas. Many other problems and disadvantages of the prior art will become apparent to one skilled in the art after comparing such prior art with the present invention as described herein.

SUMMARY OF THE INVENTION

Aspects of the invention are found in a risk analysis method, and a system for implementing such a method. In this invention, the seismic attributes are correlated versus data quality to give a relative indication of the possible success or economic viability of a particular prospect.

In one exemplary embodiment, a cross plot or matrix is formed of seismic attributes versus data quality. Seismic attributes indicative of hydrocarbons are assigned to the horizontal axis and measures of data quality are assigned to the vertical axis.

Positive seismic attributes of hydrocarbon cause a rightward shift along the horizontal axis. Negative seismic attributes of hydrocarbons cause a leftward shift along the horizontal axis.

Similarly, positive indicators of data quality cause an upward shift along the vertical axis and negative indicators of data quality cause a downward shift along the vertical axis. As confidence in data quality increase (upward shift) and positive seismic indicators of hydrocarbons increase (rightward shift), the confidence in finding hydrocarbons increases and the uncertainty in accumulation size decreases.

The upper right-hand corner of the DHI matrix represents the highest confidence in hydrocarbon presence and accumulation size. The upper left-hand corner of the DHI matrix represents high confidence that no hydrocarbons exist. The lower right-hand or left-hand corner indicates that there is no confidence, very high risk, in the presence of hydrocarbons, because data quality is sparse or of very poor quality.

Aspects of the present invention include the assignment of weights to the seismic attributes and to the data quality measures. These attributes and measures scale the response for a particular geologic province. If the geologic province is new or under-explored, it is possible to use the weights and scoring from an analogous area until drilling results in sufficient experience for matrix calibration are available.

As such, a system and method for objectively determining the risk assessment of a hydrocarbon prospect based on data quality and structural characteristics is envisioned. Other objects, advantages and novel features of the present invention will be apparent to those skilled in the art from the following detailed description of the invention, the appended claims, and in conjunction with the accompanying drawings.

DETAILED DESCRIPTION OF THE PREFERRED EMBODIMENT

Figure 10:
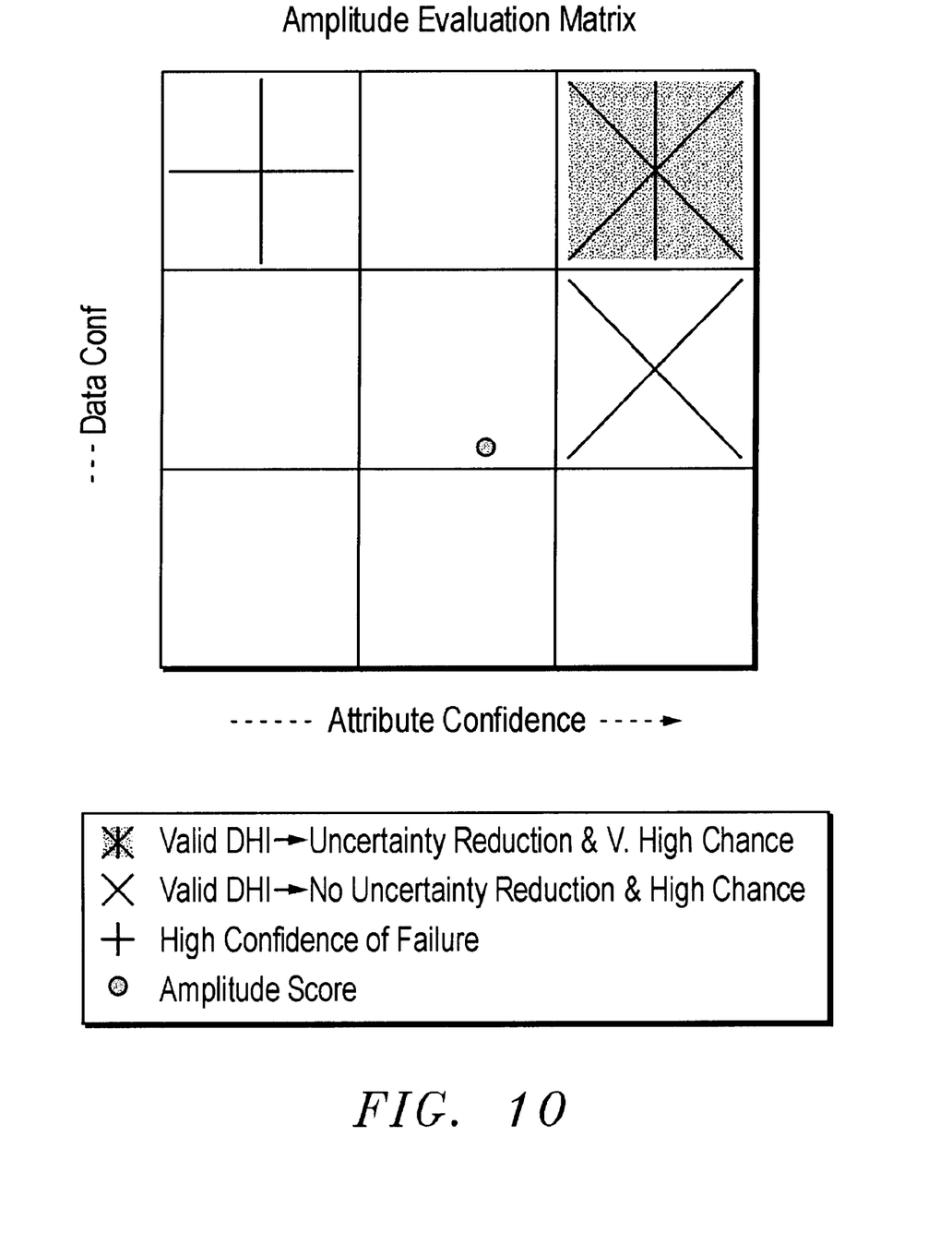
FIG. 10 is a graphical representation of the risk analysis method according to the invention.

FIG. 10 is a graphical representation of an embodiment of the exploration analysis method according to the invention. In this case, the DHI matrix is divided into nine equal area zones. In this configuration, only the rightmost two zones (the DHI positive zones) at the middle and upper level have sufficient certainty to qualify as having Direct Hydrocarbon Indicators with the appropriate certainty of hydrocarbon presence.

Furthermore, only the rightmost upper level qualifies as having both sufficient certainty for hydrocarbon presence and a reduction in the uncertainty of accumulation size. Combinations of seismic attributes and data quality falling outside these two zones do not qualify as Direct Hydrocarbon Indicators. Thus, the method compares the seismic attributes of a particular play versus the quality of data used to generate that play.

In this embodiment, the hydrocarbon presence determination, and the data quality determination are derived from component parts. These components may have various weightings. Further, the various weightings making up the final assessment may be changed or altered through other independent factors, such as the area where the play is and the effects that particular local geology may have on the individual factors.

Figure 11:
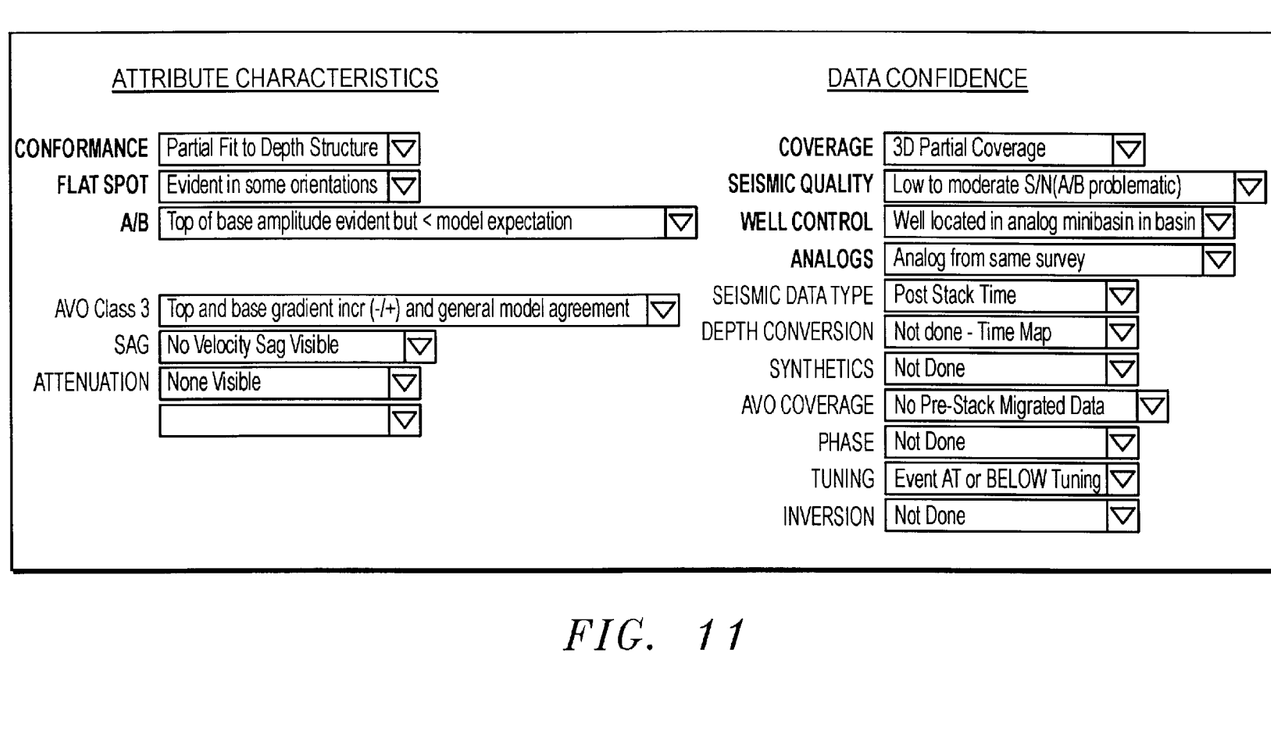
FIG. 11 is an illustration of possible seismic attributes and data quality indicators for evaluation in the DHI matrix of FIG. 10.

Movement within the DHI matrix is accomplished by evaluating several seismic attributes and the quality of the supporting information. FIG. 11 indicates various seismic attributes and data quality indicators that can be used toward this end. It should be noted that more could be defined as the science and understanding of the geology and/or new acquisition techniques are made available. For this discussion, these seismic attributes and data quality indicators will be termed primary variables.

Such primary variables for attributes include conformance, the presence of flat spots, change in amplitude over background, AVO indications, velocity sag, and attenuation. Data confidence variables include coverage, seismic quality, well control, analogs, seismic data type, depth conversion, synthetics, AVO coverage, phase, tuning, and inversion.

Associated with each of the primary variables are qualifiers. The role of the qualifiers is to assign a level of confidence to the primary variable.

For example, in one particular geologic setting, the various variables, their qualifier levels, and values for an exemplary area include:

Conformance:
  No fit to Depth Structure=2.7
  No Depth Conversion but fit to Time Map=5.4
  Partial Fit to Depth Structure=8.1
  Good Fit with some Stratigraphic Variability=10.8
  Excellent fit to Depth Structure=13.5
Flat Spot
  None Visible but expected=1.5
  Evident in some orientations but not consistent=3.0
  Laterally Consistent within stratigraphic context=4.5
A/B
  No change in amplitude over background=0.9
  Top or base amplitude evident but<model expectation=1.8
  Top and base amplitude evident but<model expectation=2.7
  Top or base amplitude generally agrees with model=3.6
  Top and base amplitude generally agrees with model=4.5
AVO Class
  No discernable change in gradient=0.6
  Top or base gradient increasing (−/+) but<model expectation=1.2
  Top and base gradient increasing (−/+) but<model expectation=1.8
  Top or base gradient increasing (−/+) and general model agreement=2.4
  Top and base gradient increasing (−/+) and general model agreement=3.0
SAG
  No Velocity Sag Visible=0.37
  None Expected=0.74
  Velocity Sag Visible=0.1.11
Attenuation
  None Visible=0.28
  None expected=0.56
  Either Frequency or Amplitude Attenuated=0.84
  Frequency and Amplitude Attenuated=1.12
Polarity Reversal
  No Polarity Reversal Visible=0.37
  None Expected=0.74
  Polarity Reversal Visible=1.11

Various values may be chosen for each variable based on the selected attribute. In this case, the values are indicative of a particular geologic region. The values for the variables may change across different regions, based upon the local hydrocarbon criteria.

In one exemplary embodiment, the variables are summed together to produce a final score. However, the determination of the final score need not entail simple summing. The determination of the score may involve using the selected criteria in various ways. For example, a structure or other seismic indicator may denote the use of multiplication, division, or any other mathematical function. Thus, the overall is score is determined through a calculation based on the variables or criteria selected.

Or, the variable or qualifiers may be dynamically generated based on other criteria. For example, the value for the AVO may be broken down by changing the class of the AVO determination. Or, the changing of one variable may effect the selection or values of other variables.

For example, the AVO variable may be selectively predetermined. Then the actual value may be associated dynamically. An example is:

| A/B tab for Class 3 (refers to stacked amplitude) | A/B tab for Class 2 (refers to stacked amplitude) | A/B tab for Class 1 (refers to stacked amplitude) |
|---|---|---|
| No change in amplitude over background | No change in amplitude or phase over background | No change in amplitude over background |
| Top or base amplitude evident but < model expectation | Top or base amplitude/phase change but amplitude change less than expected from model | Top or base amplitude less but > model expectation |
| Top and base amplitude evident but < model expectation | Top and base amplitude/phase change but amplitude change < model expectation | Top and base amplitude less but greater than expected from model |
| Top or base amplitude generally agrees with model | Top or base amplitude/phase change and amplitude change generally agrees with model | Top or base amplitude generally agrees with model |
| Top and base amplitude generally agrees with model | Top and base amplitude/phase change and amplitude change generally agrees with model | Top and base amplitude generally agrees with model |

Turning now to the data quality aspect, the quality may be delineated in a similar manner. In an exemplary embodiment in the same geologic arena, these data confidence variables and their qualifiers include:

| COVERAGE | SEISMIC QUALITY | WELL CONTROL | ANALOGS | SEISMIC DATA TYPE |
|---|---|---|---|---|
| 2D Simple Orientation = 1 | Low to moderate S/N (A/B problematic) = .8 | No wells in basin = .68 | No Analog = .68 | Post Stack Time = .18 |
| 2D Multi Orientation = 2 | Low to moderate resolution relative to bed thickness = 1.6 | Well located in analog minibasin in basin = 1.36 | Analog - different survey & acquisition parameters = 1.36 | Post Stack Depth = .36 |
| 3D Partial Coverage = 3 | Moderate to good resolution relative to bed thickness = 2.4 | Well located in same minibasin = 2.04 | Analog - different survey, same acquisition parameters = 2.04 | Pre Stack Time = .54 |
| 3D Full Coverage = 4 | High resolution relative to bed thickness = 3.2 High resolution relative to bed thickness and long offsets = 4.0 | Well <5 miles = 2.72 | Analog from same survey = 2.72 | Pre Stack Depth = .72 |

| DEPTH CONVERSION | SYNTHETICS | AVO COVERAGE | PHASE | TUNING | INVERSION |
|---|---|---|---|---|---|
| Not done - Time Map = .18 | Not Done = .18 | No Pre-Stack Migrated Data = .18 | Not Done = .17 | Event AT or BELOW Tuning = .17 | Not Done = .17 |
| Low Confidence = .36 | Poor to Fair Tie = .36 | Single Orientation = .36 | Mixed or Unknown = .34 | Event has mixed Tuning = .34 | Not Conclusive = .34 |
| Moderate confidence = .54 | Good Tie = .54 | Multiple Orientation using Angle Stk = .54 | Minimum = .51 | Event is Above Tuning = .51 | Improves Interpretation = .51 |
| High Confidence = .72 | Excellent Tie = .72 | Multiple Orientation using Gathers = .72 | Zero = .68 | | |

The primary variables have fractional values ranging over the interval of (0,1), with the corner values as indicated in FIG. 10. The total movement along either axis of the matrix is determined by scoring the individual variables. As an example, scoring for the attribute axis is reviewed.

The values associated with the individual score determinations for the criteria may be determined many ways. They may be derived mathematically, or they may be looked up in a table.

For example, if the coverage variable, assume that the maximal value may be determined to be 0.9 in the overall weighting. The values tied to each of the choices may be stored elsewhere, or preset. For example assume that the 2D simple orientation is given as 0.1, 2D multi orientation may be given as 0.2, 3D partial coverage may be defined as 0.7, and 3D full coverage may be defined as 0.9.

Or, the value may be defined as some function according to the spot in the list. For example, the value of the coverage is defined as 0.8. The exemplary values for the resulting choices would be 2D simple orientation is given as 0.2, 2D multi orientation may be given as 0.4, 3D partial coverage may be defined as 0.6, and 3D full coverage may be defined as 0.8. In this case, the value is defined as (0.2×(place in list)). This formulation allows full capabilities to be used in using the invention in a spreadsheet environment.

Also, the values among the variable may or may not be static. In one embodiment, the weights of each variable are independently weighted, making some aspects more crucial than others. Or, the terms of the values may change based on an overlaying choices.

Figure 12:
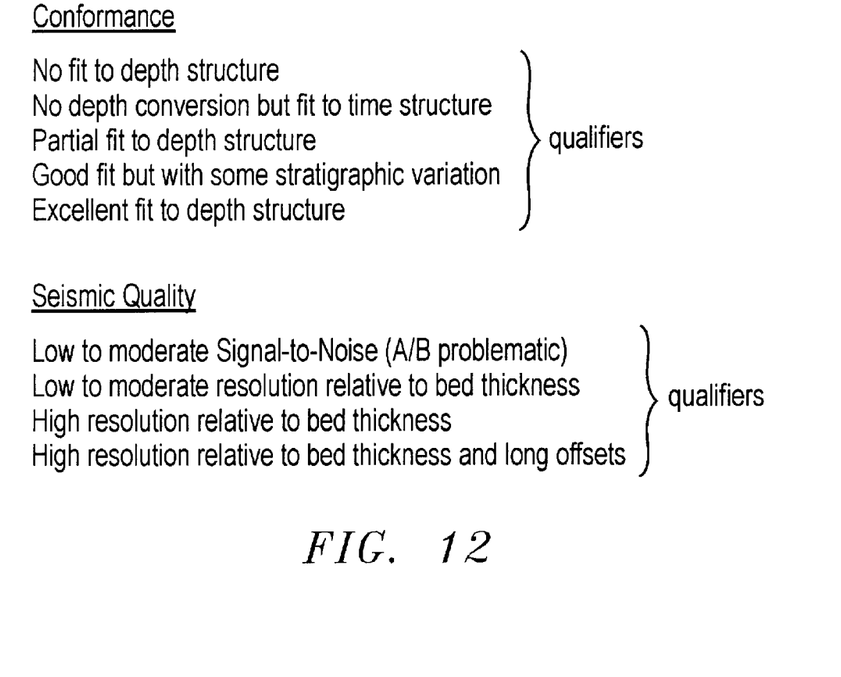
FIG. 12 is an illustration of exemplary qualifiers to the seismic attribute, Conformance, and the data quality indicator, Seismic Quality.

The following terms are defined:

$q_m$ = qualifier for the mth attribute $Q_m$ = maximum qualifier for the mth attribute $w_m$ = weight for the mth attribute $S_m$ = maximum score for the mth attribute $s_m$ = score for the mth attribute As illustrated in FIG. 12, $q_1$, the qualifier for Conformance, can assume values in the interval (0,4) and $Q_1$ = 4.

Also, by definition:

$w_m = S_m/Q_m$ summation of $S_m$ = 1 (for m=1 to M)

M = maximum number of attributes $s_m = q_m * w_m = (q_w/Q_m) * S_m$.

Figure 13:
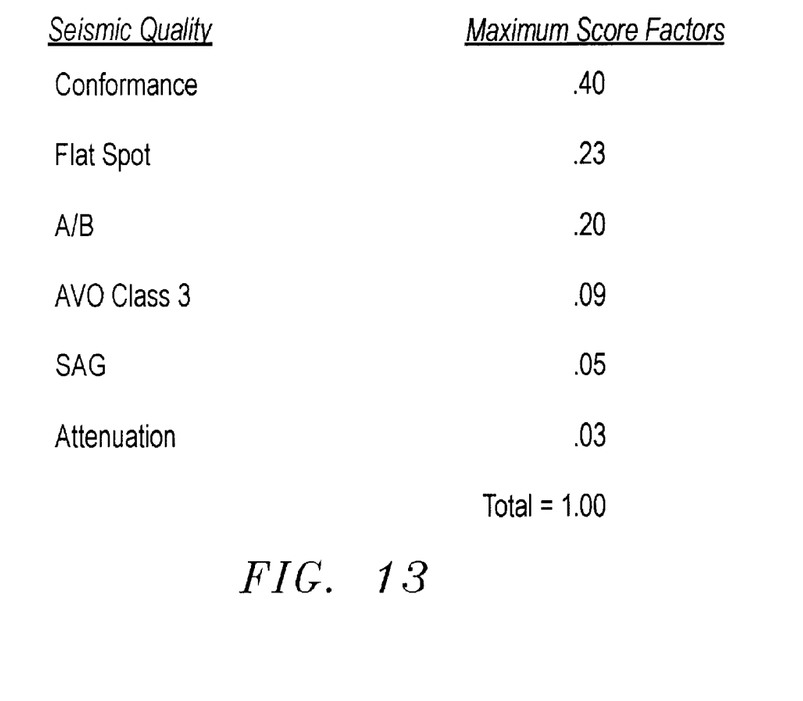
FIG. 13 is an exemplary tabular representation of values assigned to the maximum score factors used in the system of FIG. 10.

The maximum score factors $S_m$, act as scaling weights for the relative contribution of the primary variables. As an illustration, FIG. 11 provided one set of possible attributes for the horizontal axis of the DHI matrix. In FIG. 13 these same attributes are assigned values for $S_m$ that experience shows are appropriate for evaluating a class of gas sands in the Gulf of Mexico.

Figure 14:
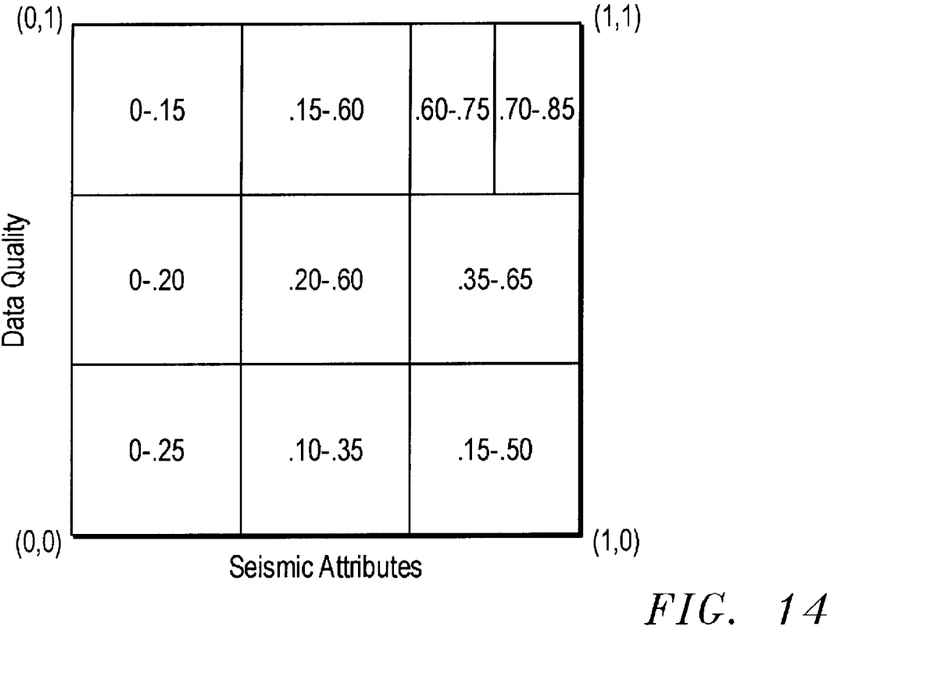
FIG. 14 is an exemplary illustration of the DHI matrix map of FIG. 10 showing geologic risk for hydrocarbon presence for the case of one class of gas sands in the Gulf of Mexico.
Figure 15:
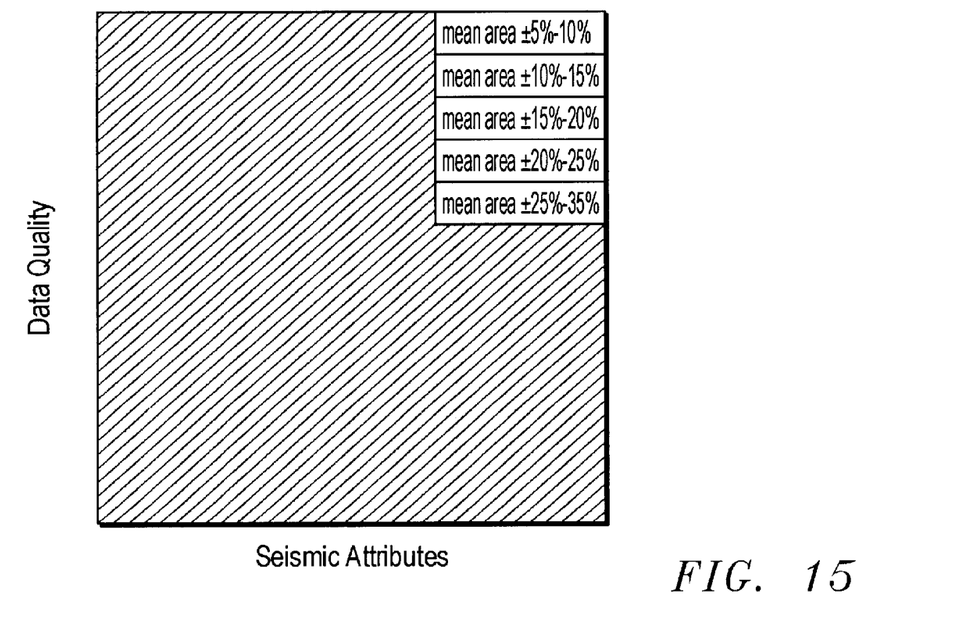
FIG. 15 is an illustration of mean accumulation derivation using an exemplary aspect of the invention.

In addition to the importance of the scoring factors, $S_m$, the DHI matrix requires a calibration of scoring zones as guidelines for geologic risk, Pg, and the variance in expected accumulation size. The calibration step is empirical, relying on prior drilling results. A major advantage of the method is that once the calibration is made with a statistically significant number of wells, then the matrix becomes predictive of future results. This prediction can be in the same geologic provenance or in an analog setting. FIGS. 14 and 15 illustrate the results of this calibration process for a class of gas sands in the Gulf of Mexico.

FIG. 14 shows geologic risk for hydrocarbon presence. On the leftmost side of the matrix the geologic risk increases as data quality increases. This means that the seismic attributes for hydrocarbon presence are low but that data quality is high, so that the risk that there are no hydrocarbons is high. Similarly, on the rightmost side of the matrix, the geologic risk decreases (chance of success increases) as data quality increases. With similar reasoning, as data quality increases and the attributes for hydrocarbon presence become more positive, the chance for success should increase.

FIG. 15 demonstrates how the DHI matrix modifies the uncertainty in accumulation size. With the exception of the upper rightmost zone, the DHI matrix indicates that no change to the conventional estimate for accumulation size is justified. Only in the case that data quality is high and the seismic attributes are very positive does the matrix allow volume estimates for the accumulation size to vary on a percentage basis about the mean predicted value.

The mean predicted value in the case of a qualified DHI is the measured map size of the seismic attribute. However, as the data quality increases and further defines the types of structures with more precision, the deviation about that mean is progressively lessened. In this manner, more accurate assessments about accumulation volumes may be assessed with the data.

Many typical current hydrocarbon risk analysis methods are not qualified by a quantitative method, which integrates data quality with seismic attributes. The present invention exemplifies a quantitative method that can be calibrated in proven petroleum basins and extrapolated to a frontier basin with analogous characteristics. This method improves upon conventional hydrocarbon risk analysis by the use of measurable indicators from seismic data to the risk and size analysis steps of hydrocarbon prospect management.

Of course, the invention may be embodied on a computer or software that runs on a computer. It may be embodied in any combination of software or hardware, including running instructions from any computer readable medium.

The invention as described and illustrated here is an effective method for managing decision-making within a portfolio of exploration opportunities, however those skilled in the art will recognize that many modifications and variations of the present invention are possible without departing from the invention. Accordingly, it should be clearly understood that the present invention is not intended to be limited by the particular features described and illustrated in the drawings, but the concept of the present invention is to be measured by the scope of the appended claims.

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment or algorithm so described.

We claim:

1. A method for estimating the likelihood of the presence of natural resources within a predetermined search region, comprising the steps of:

generating a plurality of seismic attributes pertaining to the likelihood of finding the desired natural resources within the predetermined search region;

assigning a value to each of the plurality of seismic attributes;

generating a plurality of data confidence indicators;

assigning a value to each of the plurality of data confidence indicators;

deriving a final seismic attribute value associated with the plurality of seismic attributes;

deriving a final data confidence indicator value associated with the plurality of data confidence indicators;

correlating said final seismic attribute value with said final data confidence indicator value to derive the geologic confidence in finding the desired natural resources within the predetermined search region; and graphically representing said geologic confidence.

2. The method of claim 1 wherein one of the plurality of sesimic attributes is chosen from the group consisting of: a fit of signal to depth structure, presence of a flat spot, amplitude over background, amplitude versus offset characterization, velocity sag, and attenuation of return signal.

3. The method of claim 1 wherein one of the plurality of data confidence indicators is chosen from the group consisting of: coverage of seismic data, seismic data quality, well control values, seismic data type, depth conversion confidence, synthetic tie value, AVO coverage, phase, tuning, and inversion.

4. The method of claim 1, wherein the step of assigning a value to each of the plurality of data confidence indicators comprises:

for any one of the plurality of data confidence indicators, determining the specific value with a lookup table.

5. The method of claim 1, wherein the step of assigning a value to each of the plurality of data confidence indicators comprises:

for any one of the plurality of data confidence indicators, determining the value of the one of the plurality of data confidence indicators based on the order it is in a menu.

6. The method of claim 1, the step of graphically representing comprising plotting the final data confidence value against the data confidence indicator value.

7. The method of claim 1, the step of graphically representing comprising plotting a weighted average of the plurality of values making up the seismic attribute values against a weighted average of the plurality of values making up the data confidence indicator values.

8. The method of claim 1, the step of graphically representing comprising plotting the final seismic attribute value against a final data confidence indicator value in a matrix.

9. The method of claim 8, the matrix comprising a plurality of zones, each of the zones indicating the likelihood of the presence of hydrocarbons.

10. The method of claim 9 further comprising:

determining an overall geologic confidence value based on the zone in which the step of correlating places.

11. A system for representing the geologic confidence in a search for desired natural resources within a predetermined search region, the system comprising:

a processor;

a graphical display communicatively coupled to the processor;

a storage, communicatively coupled to the processor, for data that the processor may operate, the data comprising:

instructions for generating a plurality of seismic attributes pertaining to the likelihood of finding the desired natural resources within the predetermined search region;

instructions for assigning a value to each of the plurality of seismic attributes;

instructions for generating a plurality of data confidence indicators;

instructions for assigning a value to each of the plurality of data confidence indicators;

instructions for deriving a final seismic attribute value associated with the plurality of seismic attributes;

instructions for deriving a final data confidence indicator value associated with the plurality of data confidence indicators;

instructions for correlating said final seismic attribute value with said final data confidence indicator value to derive the geologic confidence in finding the desired natural resources within the predetermined search region; and instructions for graphically representing said geologic confidence.

12. The system of claim 11 wherein one of the plurality of sesimic attributes is chosen from the group consisting of: a fit of signal to depth structure, presence of a flat spot, amplitude over background, amplitude versus offset characterization, velocity sag, and attenuation of return signal.

13. The system of claim 11 wherein one of the plurality of data confidence indicators is chosen from the group consisting of: coverage of seismic data, seismic data quality, well control values, seismic data type, depth conversion confidence, synthetic tie value, AVO coverage, phase, tuning, and inversion.

14. The system of claim 11, wherein the instructions for assigning a value to each of the plurality of data confidence indicators comprises:
   instructions for performing:
      for any one of the plurality of data confidence indicators, determining the specific value with a lookup table.

15. The system of claim 11, wherein the step of assigning a value to each of the plurality of data confidence indicators comprises:
   instructions for performing:
      for any one of the plurality of data confidence indicators, determining the value of the one of the plurality of data confidence indicators based on the order it is in a menu.

16. The system of claim 11, the instructions for graphically representing comprising instructions for plotting the final data confidence value against the data confidence indicator value.

17. The system of claim 11, the instructions for graphically representing comprising instructions for plotting a weighted average of the final seismic attribute value against a weighted average of the data confidence indicator value.

18. The system of claim 11, the instructions for graphically representing comprising instructions for plotting the final seismic attribute value against a final data confidence indicator value in a matrix.

19. The system of claim 18, the matrix comprising a plurality of zones, each of the zones indicating the likelihood of the presence of hydrocarbons.

20. The system of claim 19 further comprising:
   instructions for determining an overall geologic confidence value based on the zone in which the step of correlating places the endpoint in.

* * * * *